INVENTORS
AKINORI WATANABE
TAKEKI ANDO

BY

ATTORNEY

United States Patent Office 3,460,014
Patented Aug. 5, 1969

3,460,014
SPEED CONTROL SYSTEM FOR DIRECTLY COUPLED INDUCTION MOTORS OF DIFFERENT SYNCHRONOUS SPEED
Akinori Watanabe, Katsuta-shi, and Takeki Ando, Hitachi-shi, Japan, assignors to Hitachi, Ltd., Tokyo, Japan, a corporation of Japan
Filed Sept. 26, 1966, Ser. No. 581,897
Claims priority, application Japan, Oct. 6, 1965, 40/60,738
Int. Cl. H02p 7/68, 7/74; H02k 17/34
U.S. Cl. 318—46                                    4 Claims

ABSTRACT OF THE DISCLOSURE

A speed control system for a pair of induction motors directly coupled to each other and adapted to drive a load in association with each other, said motors consisting of a first induction motor of high synchronous speed and a second induction motor of low synchronous speed, wherein for decreasing the rotating speed of the motors to the synchronous speed of the second motor a regenerative braking of the second motor is effected and thereafter a dynamic braking operation is performed by effecting the D.C. excitation of said first motor according to the rotating speed of said motors.

---

This invention relates to a speed control system for controlling the speed of an induction motor or of a set of induction motors over a wide range.

In an elevator, for example, load torque varies from positive to negative, or vice versa, namely, load torque is positive in some cases, and is negative in other cases, and a wide range of speed control is needed according to the load torque variation from positive to negtaive, and vice versa. In an elevator, the relation between weight of an elevator cage and a counter weight of an elevator is varied or reversed frequently according to the number of passengers on the elevator, and a specially precise speed control at low speed is needed to stop the elevator precisely at each floor stage. Accordingly, a speed control system is required for an elevator according to the above described characteristics of an elevator.

In the past, most of the control systems used for a load which requires the speed thereof to be controlled in a wide range as described above have adapted a pole-change type induction motor, of which the number of poles is changed to perform both a high speed operation and a low speed operation, whereby speeds both at a high speed operation and at a low speed operation are controlled by a secondary resistance control system respectively.

In the conventional system as described above, an induction motor requires a large number of poles at low speed operation and a large ratio of the number of poles at low speed operation to the number poles at high speed operation.

An induction motor provided with a large number of poles has deficiencies in that it is large in size and therefore occupies a large installation area and it is expensive.

The object of this invention is to provide a speed control system for an induction motor whereby the above-described deficiencies are eliminated. In this invention, two synchronous induction motors, the speeds thereof being different from each other, are connected directly or constructed to be integral with each other, whereby a low speed operation can be performed for a load varying in a wide range, without greatly increasing the number of poles of the low speed motor, and accordingly the present invention avoids an increase in installation area and cost, and dispenses with the necessity of using a speed indication generator.

Figure 1:
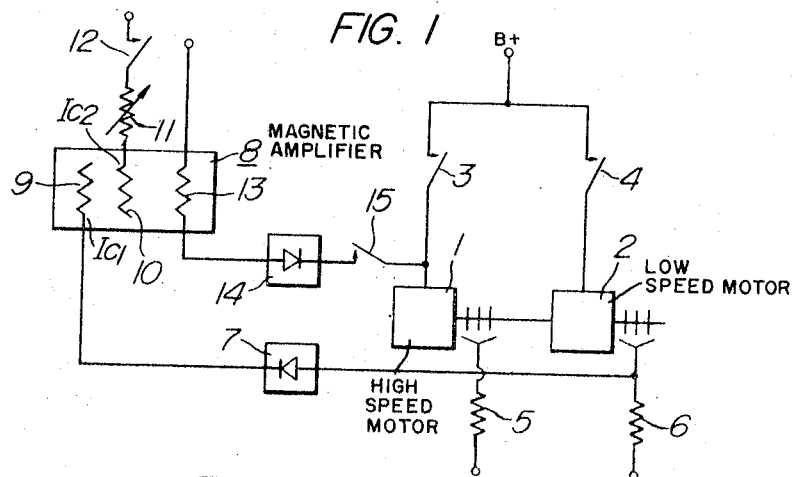
Figure 2:
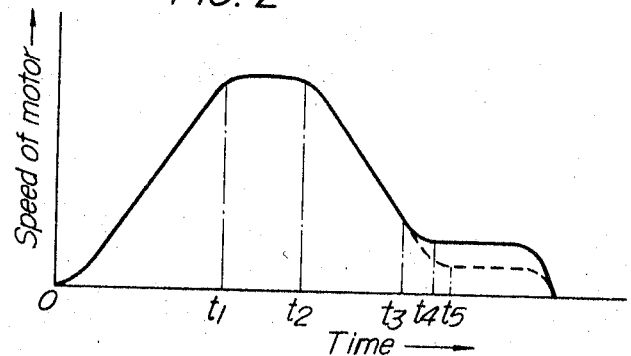
Figure 3:
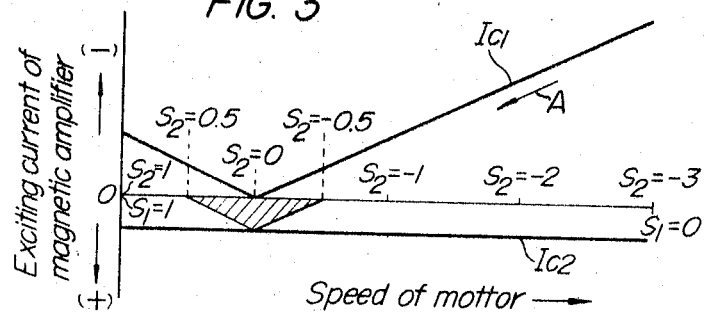

Hereinafter, a detailed explanation of this invention will be made with reference to the drawings, wherein, FIG. 1 is a schematic diagram of a speed control system for an induction motor embodying this invention, FIG. 2 is a speed characteristic curve of an elevator, and FIG. 3 shows the relation between exciting current of a magnetic amplifier used in this invention and the slip S of an induction motor.

In FIG. 1, reference numeral 1 denotes a high speed rotor wound type induction motor, of for example, 6 poles, and reference numeral 2 denotes a low speed induction motor of, for example, 24 poles. Reference numerals 3 and 4 denote power source switches for the motors 1 and 2, respectively, and 5 and 6 denote secondary resistances of the motors 1 and 2, respectively. Reference numeral 7 denotes a rectifier which rectifies the secondary current $I_{c1}$ of the low speed motor 2, which current is applied to the exciting winding 9 of a magnetic amplifier 8. Reference numeral 10 denotes the control winding of the magnetic amplifier 8, which is connected to a D.C. power source through a power source switch 12 and variable resistance 11 so that the current $I_{c2}$ thereof can be set by the variable resistance 11. Reference numeral 13 denotes the output winding of the magnetic amplifier 8 connected to the primary winding of the high speed motor 1 through a rectifier 14 and a switch 15 to excite the motor 1. The magnetic amplifier 8 generates an output in response to the difference between the currents $I_{c2}$ and $I_{c1}$ so long as $I_{c2} > I_{c1}$, which output serves as a D.C. control applied to the motor 1. The contactors 4, 12 and 15 are so constructed that they open or close simultaneously.

FIG. 2 illustrates speed characteristics of an elevator, wherein the solid line shows the speed characteristic of an induction motor when the number of poles of the induction motor is to be changed from 6 poles to 24 poles according to the conventional method. According to the conventional method, an elevator is started with an induction motor having 6 poles as a high speed motor, and is driven after reaching synchronous speed at this high speed from time $t_1$ to time $t_2$. At time $t_2$, the number of poles of the induction motor is changed to 24 changing the synchronous speed of the motor from a high speed to a low speed, and the motor performs a regenerative braking operation until time $t_4$. After the time $t_4$, the elevator is driven by the motor at the low speed.

In an elevator of a high merit, it is necessary to stop the elevator more precisely at each floor by providing a slow speed having a rate half of the above conventional slow rate of speed.

To reach the above object, in a conventional elevator, the ratio of the respective number of poles of a driving motor at a low speed and at a high speed is required to be large, such as 6 poles to 48 poles. Thus the number of poles of a driving motor at low speed is made remarkably large, causing the motor to be accordingly large in size. Such a motor is not desirable in view of the installation area and cost thereof.

Now, the control system of this invention will be explained.

In FIG. 1, the high speed motor 1 is started by closing the switch 3 and stopped by opening the switch 3 and the low speed motor 2 is started by closing the switch 4, simultaneously with the opening of switch 3, at time $t_2$. Then the speed of the elevator is decreased by the regenerative braking force of the motor 2 in a similar manner as described relating to a conventional method between times $t_2$ and $t_3$.

FIG. 3 illustrates the relation between the exciting current of a magnetic amplifier 8 and the speeds of the motors 1 and 2. The current $I_{c1}$ of the exciting winding 9 of a magnetic amplifier 8 derived from the secondary winding of motor 2 decreases at a certain rate corresponding to the decrease of the speed of the motor 2 during the regenerative braking of motor 2, as shown by an arrow A in FIG. 3, and becomes zero at the point where the slip $S_2$ of the motor 2 is zero, i.e., when motor 2 is driven at its synchronous speed. The current $I_{c1}$ will then increase at a rate equal to the rate of decrease, if the speed of motor 2 further decreases. As shown in FIG. 3, the slopes of the lines each illustrating the decrease and the increase of the current $I_{c1}$ respectively are equal to each other, they extend in different directions.

By setting the current $I_{c2}$ of the control winding 10 of the magnetic amplifier 8 to a value equal to the current $I_{c1}$ at slip $S_2=\pm 0.5$, as shown in FIG. 3, the output current of winding 13 of the magnetic amplifier 8 will be proportional to the hatched portion in FIG. 3.

With commencement of the operation of the elevator, and switches 4, 12 and 15 open, the switch 3 is first closed and the motor 1 is started, its speed being increased until it is balanced with the torque of the load and is operated at the predetermined slip (refer to the interval $0-t_1$ in FIG. 2).

The motor 1 thereafter causes the elevator cage to travel at a substantially constant speed (refer to the interval $t_1-t_2$ in FIG. 2), but when the elevator reaches a speed reducing point established at a location spaced a predetermined distance from the destination floor of the elevator, a speed reducing directive is given, the switch 3 is released, and the motor 1 is interrupted from the power source, while the switches 4, 12, and 15 are closed and thereby the motor 2 is connected with the power source. However, since the actual speed of the motor at this time is higher than the synchronous speed thereof, the motor 2 is operated as an induction generator as described above. That is, a regenerative braking action is performed by the motor 2. This occurs in the interval $t_2-t_3$ in FIG. 2. In this case, as will be clear from FIG. 3, since the rotating speed of the motor 2 is high and the slip thereof is also great, and the current obtained in the secondary winding of the motor 2 (it is well known that this current is proportional to slip) is also high, the output current of the rectifier 7, i.e., the input current $I_{c1}$ will be large. Consequently, the relation between two input currents $I_{c1}$ and $I_{c2}$ of the magnetic amplifier 8 being $I_{c1} > I_{c2}$, no output will be obtained from the magnetic amplifier 8. Therefore, the motor 1 rotates idly. Thus, the motors are reduced in speed due to the regenerative braking of motor 2 alone and as the result of that the slip gets smaller, and the secondary voltage of the motor 2, i.e., $I_{c1}$ is also lowered.

When the speed of the motor 2 is gradually decreased by the regenerative braking effect, and the slip $S_2$ of the motor becomes $S_2=-0.5$, $I_{c1}$ will become equal to $I_{c2}$, with the result that further braking will result in an output voltage of the magnetic amplifier 8 being initiated. Accordingly, the high speed motor 1 will be excited with a D.C. current through the rectifier 14 and the contactor 15. As is well known, when a D.C. current is made to flow through the primary winding of the induction motor in rotation, an induced current is generated in the secondary winding of the induction motor 1 and consumed by the secondary resistance 5 thereof. This results in an arrangement forming a dynamic brake. In consequence, in the interval $t_3-t_4$ in FIG. 2, when a D.C. current is supplied to the motor 1 from the magnetic amplifier, the reduction of speed is produced by both the regenerative brake of the motor 2 and the dynamic brake of the motor 1. When the speed of the motors reaches the synchronous speed of the motor 1, that is, when $S_2$ has become zero, it is no longer possible for the motor 2 to exert its regenerative brake; however, when $S_2$ has become zero, the induced current in the secondary winding of the motor also becomes zero and thus $I_{c1}$ becomes zero. Therefore, as shown in FIG. 3, the output of the magnetic amplifier 8, i.e., the directive of the dynamic brake, becomes maximum. When the speed of the motor 2 decreases to a value below the slip $S_2=0$, the output of the magnetic amplifier 8 decreases, and therefore the braking force is reduced. And, at a speed slightly higher than a speed at which the dynamic brake force becomes zero, that is, in this case at a speed slightly higher than the half speed of the synchronous speed of the low speed motor 2 ($S_2=0.5$), the speed of the motors is stabilized. Under this condition, the dynamic brake and the torque of the load are balanced with the torque exerted by the low speed motor 2.

The dotted line in FIG. 2 shows the speed characteristics of an elevator or motor according to this invention. A regenerative braking operation is performed from time $t_2$ to $t_3$, and a dynamic braking operation is performed in combination with the regenerative braking operation from time $t_3$ to $t_4$, and only the dynamic braking operation is performed from about time $t_4$. The above-described time $t_3$ is a time when the slip $S_2$ of the low speed motor is equal to $-0.5$, i.e. $S_2=-0.5$.

In the above description, the explanation has been made relating to the case when the current $I_{c2}$ is set equal to the current $I_{c1}$ when the slip $S_2$ of the motor 2 is $-0.5$, i.e. $S_2=-0.5$. However, it can be easily understood that the final low stable speed of an elevator can be varied over a wide range by setting the current $I_{c2}$ equal to the current $I_{c1}$ at any value of the slip of the motor 2 between zero and $-1$, and therefor detailed explanations thereof are omitted.

In the above, one embodiment of this invention is explained. According to this invention, a low speed, stable driving of a load, the speed of which requires to be controlled over a wide range, can be performed without increasing so much the number of poles of an induction motor, and accordingly without increasing the installation area and cost, and also without using a speed indication generator.

What we claim is:

1. A speed control system for induction motors comprising a high speed wound rotor type A.C. driven induction motor and a low speed wound rotor type A.C. driven induction motor, said two motors being coupled directly to each other, a magnetic amplifier driven by an A.C. source, the control winding thereof being supplied from a separate D.C. power source, a first circuit for connecting the secondary output of said low speed induction motor to the exciting winding of said magnetic amplifier through a first rectifier, and a second circuit for connecting the output of said magnetic amplifier to the primary D.C. exciting winding of said high speed induction motor, whereby the D.C. excitation of said high speed motor is initiated when the current of the exciting winding of said magnetic amplifier becomes equal to a predetermined value of current of said control winding of said magnetic amplifier, and said D.C. excitation of said high speed motor varies corresponding to the difference between said two currents after the D.C. excitation of said high speed motor is initiated.

2. A speed control system for induction motors according to claim 1, wherein said high speed wound rotor type induction motor is formed integral with said low speed wound rotor type induction motor.

3. A speed control system for a pair of wound rotor type induction motors of different synchronous speeds, said motors being directly coupled to each other and consisting of a first high speed motor and a second low speed motor comprising:

exciting means for exciting said motors, switch means for selectively disconnecting said high speed motor from and connecting said low speed motor to said exciting means, control means for producing a D.C. excitation signal in response to detection of the secondary current of said low speed motor being reduced below a predetermined value, and means for applying said D.C. excitation signal to said high speed motor to effect a dynamic braking thereof, said D.C. excitation current varying in accordance with the difference between said predetermined value and the absolute value of said secondary current.

4. A speed control system for induction motors as defined in claim 3 wherein said control means includes a magnetic amplifier arrangement having at least an exciting winding connected to the secondary winding of said low speed motor, an output winding connected to the primary winding of said high speed motor, and a control winding connected to a variable voltage source.

References Cited

UNITED STATES PATENTS

| 1,628,409 | 5/1927 | Kelsey | 318—46 |
| 1,701,368 | 2/1929 | Hobart | 318—46 |
| 2,046,721 | 7/1936 | Bouton et al. | 318—87 |
| 3,147,418 | 9/1964 | Vogt | 318—87 XR |

ORIS L. RADER, Primary Examiner

G. Z. RUBINSON, Assistant Examiner

U.S. Cl. X.R.

318—87, 212